United States Patent
Severinski et al.

(10) Patent No.: US 8,783,768 B2
(45) Date of Patent: Jul. 22, 2014

(54) LEATHER TRIM COVER ASSEMBLY WITH STRETCH REDUCTION

(75) Inventors: Paul S. Severinski, Brownstown, MI (US); Karl Henn, New Hudson, MI (US); Pusheng Chen, Novi, MI (US); Thomas A. Welch, Sr., Ortonville, MI (US); Louella Patterson, Goodells, MI (US); Larry Hulme, St. Clair Shores, MI (US); William Paruszkiewicz, Clinton Township, MI (US); Benedict J. Messina, Warren, MI (US); Bryan Orlando, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 68 days.

(21) Appl. No.: 13/336,329

(22) Filed: Dec. 23, 2011

(65) Prior Publication Data

US 2012/0175935 A1    Jul. 12, 2012

Related U.S. Application Data

(60) Provisional application No. 61/430,754, filed on Jan. 7, 2011.

(51) Int. Cl.
*A47C 31/00* (2006.01)
*B60N 2/58* (2006.01)

(52) U.S. Cl.
CPC .................................. *B60N 2/5891* (2013.01)
USPC .................................... 297/218.1; 297/219.1

(58) Field of Classification Search
CPC ........... B60N 2/58; B60N 2/5891; A47C 7/26
USPC .................. 297/218.1–218.5, 219.1, 224
See application file for complete search history.

(56) References Cited

U.S. PATENT DOCUMENTS

| | | | |
|---|---|---|---|
| 3,207,654 A * | 9/1965 | Reilly | 442/183 |
| 3,371,957 A * | 3/1968 | Cook | 297/225 |
| 4,438,574 A * | 3/1984 | Johnson | 36/45 |
| 4,588,838 A | 5/1986 | Byrd | |
| 4,669,779 A * | 6/1987 | Kaganas et al. | 297/229 |
| 5,669,670 A * | 9/1997 | Haraguchi et al. | 297/452.61 |
| 6,345,865 B1 * | 2/2002 | Ashida et al. | 297/195.1 |
| 6,835,677 B2 * | 12/2004 | McCabe et al. | 442/149 |
| 7,677,660 B2 | 3/2010 | Galbreath et al. | |
| 7,823,980 B2 * | 11/2010 | Niwa et al. | 297/452.61 |
| 7,937,815 B2 | 5/2011 | Hamilton et al. | |
| 7,946,649 B2 | 5/2011 | Galbreath et al. | |
| 2006/0264555 A1 | 11/2006 | Lustiger et al. | |
| 2007/0040421 A1 | 2/2007 | Zuzga et al. | |
| 2011/0227390 A1 | 9/2011 | Lovasz | |
| 2011/0285161 A1 | 11/2011 | Sweers et al. | |

* cited by examiner

*Primary Examiner* — Sarah B McPartlin
(74) *Attorney, Agent, or Firm* — Brooks Kushman P.C.

(57) ABSTRACT

The present invention relates a vehicle seat assembly comprising a frame, a cushion supported on the frame, and a trim cover assembly secured over the cushion, the trim cover assembly comprising a leather trim material and a reinforcing layer secured to the leather trim material, the reinforcing layer being less flexible than the leather trim material, the trim cover assembly having a percent reduction in stretch relative to a similar trim cover assembly not having the reinforcing layer of 40% to 95% as measured according to SAE J855.

15 Claims, 3 Drawing Sheets

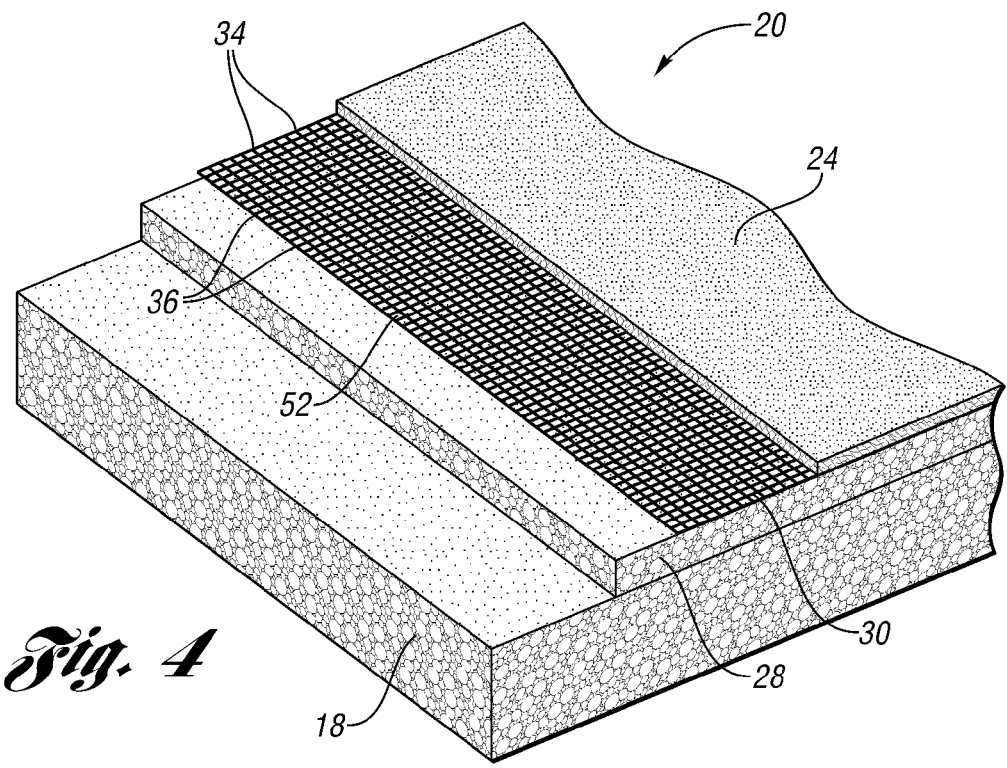
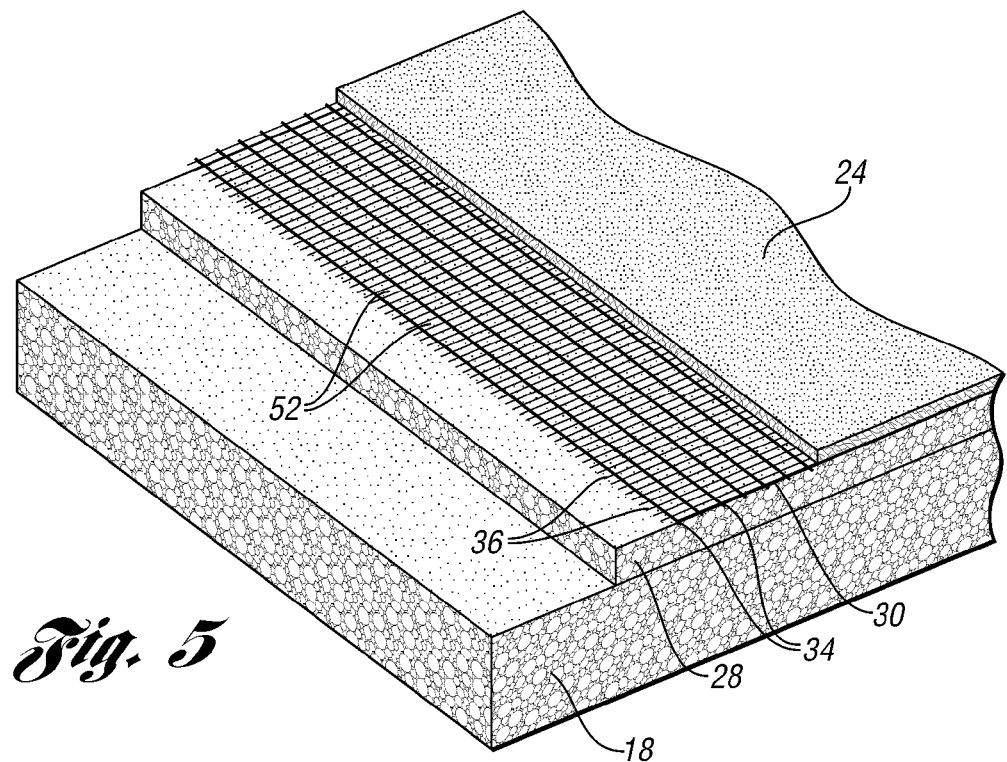

LEATHER TRIM COVER ASSEMBLY WITH STRETCH REDUCTION

CROSS-REFERENCE TO RELATED APPLICATIONS

This application claims the benefit of U.S. provisional Application No. 61/430,754 filed Jan. 7, 2011, the disclosure of which is incorporated in its entirety by reference herein.

TECHNICAL FIELD

The present disclosure relates in general to a reinforced leather trim cover assembly.

BACKGROUND

Vehicle seats generally include a seat back and a seat cushion or bottom. The seat back is commonly pivotally attached to the seat bottom. Each of the seat back and the seat bottom typically include a cushion or padding and a trim cover assembly for decoratively covering and protecting the cushion. Typically, the cushion is made of an expandable foam material and is molded to a desired shape. A common material for trim cover material is leather. Leather has a tendency to stretch and not fully recover, and thus can be considered to have a relatively low recovery or relatively high set. Over time, this leads to an irreversible and unsightly wrinkling of the leather seat. As appearance is one of the prime motivating factors in the purchase of a vehicle, the appearance of the leather cover for vehicle seats is an important consideration. Moreover, leather seats are often times equipped with climate control systems that require the leather trim cover to have air flow holes. As the leather wrinkles over time, the change in shape may impact the intensity of the holes and affect operability of the climate control system. It would be desirable to improve long-term appearance of leather seats and minimize impact on any climate control functions, if present.

SUMMARY

In at least one embodiment, the present disclosure comprises a reinforced leather trim cover assembly having a reinforcing scrim. While the term "scrim" will be used throughout to refer to the reinforcing layer, it should be understood that various types of scrims and other scrim-like layers, such as screen-type materials, and non-scrim reinforcing layers, could be employed and the use of the term "scrim" is not limiting to just classic scrims. Moreover, the scrim can have strands extending in only one direction as opposed to cross-woven scrims. In certain embodiments, the reinforcing scrim helps to control and limit the overall stretch and set characteristics of the leather trim cover assembly. Stretch and set are both measured by SAE J855. Moreover, utilizing scrims with openings or that are otherwise air permeable will not deleteriously impact operability of a climate control system. In accordance with at least one aspect of the present disclosure, reinforced leather trim cover assemblies having a reinforcing scrim can have a percent reduction in stretch relative to a similar trim cover assembly not having the reinforcing layer of 40% to 95% as measured according to SAE J855. While in one embodiment, the leather trim cover assembly is reinforced with scrim only in the insert or seat pocket (i.e., seating) area, the scrim can be located in other discrete areas of the trim cover or over the entire "B" surface of the trim cover.

In at least one embodiment, the scrim is sewn or otherwise attached to a portion, such as the insert location, of the leather trim cover. This sewing could take place at the seam lines and/or at other locations of the leather trim cover. In other embodiments, the reinforced leather trim cover could have a thin layer of backing material such as foam or other suitable material disposed or otherwise attached, such as laminated, on the side of the scrim opposite the leather.

In at least one aspect, a vehicle seat assembly is provided comprising a frame, a cushion supported on the frame, and a trim cover assembly secured over the cushion, wherein the trim cover assembly comprises a leather trim material and a reinforcing layer secured to the leather trim material, with the reinforcing layer being less flexible than the leather trim material and the trim cover assembly having a percent reduction in stretch relative to a similar trim cover assembly not having the reinforcing layer of 40% to 95% as measured according to SAE J855.

In at least another aspect, a trim cover assembly is provided comprising a leather trim material, and a reinforcing layer secured to the leather trim material, with the reinforcing layer being less flexible than the leather trim material and the trim cover assembly having a percent reduction in stretch relative to a similar trim cover assembly not having the reinforcing layer of 40% to 95% as measured according to SAE J855.

In still yet another aspect, a method of manufacturing vehicle seat assembly is provided comprising providing a cushion assembly comprising a cushion supported on a frame, and securing a trim cover assembly over the cushion assembly, with the trim cover assembly comprising a leather trim material and a reinforcing layer secured to the leather trim material, and with the reinforcing layer being less flexible than the leather trim material and the trim cover assembly having a percent reduction in stretch relative to a similar trim cover assembly not having the reinforcing layer of 40% to 95% as measured according to SAE J855.

BRIEF DESCRIPTION OF THE DRAWINGS

Certain embodiments of the present disclosure are pointed out herein. However, other features of the various embodiments will become more apparent and will be further understood by referring to the following detailed description in conjunction with the accompanying drawings, in which:

FIG. 4 is a schematic cut-away perspective view of components of an embodiment of a leather trim cover assembly over a cushion with portions removed for illustrative purposes;

FIG. 5 is a view similar to FIG. 4 illustrating another embodiment;

DETAILED DESCRIPTION

As required, detailed embodiments of the present disclosure are disclosed herein. However, it is to be understood that the disclosed embodiments are merely exemplary of the disclosure that may be embodied in various alternative forms.

The figures are not necessarily to scale, some features may be exaggerated or minimized to show details of particular components. Therefore, specific structural or functional details disclosed herein are not to be interpreted as limiting, but merely as a representative basis for the claims and/or a representative basis for teaching one skilled in the art to variously employ the present disclosure.

Moreover, except for otherwise expressly indicated, all numerical quantities in this description indicating amounts are to be understood as modified by the word "about" in describing the broader scope of the disclosure. Also, unless expressly stated to the contrary, the description of a group or class of materials as suitable or preferred for a given purpose in connection with the disclosure implies that any two or more members of the group or class may be equally suitable and preferred.

Figure 1:
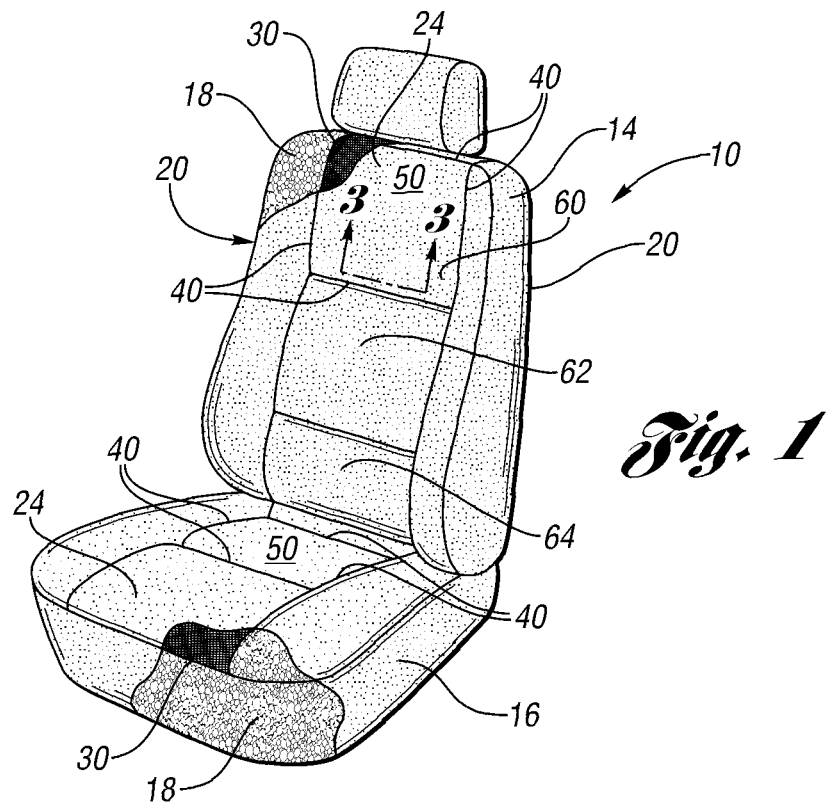
FIG. 1 is a schematic environmental view of an exemplary vehicle seat assembly incorporating an embodiment of a trim cover assembly.

Referring now to the Figures, where like numerals are used to designate like structures throughout the drawings, a schematic exemplary vehicle seat assembly in accordance with at least one embodiment of the present invention is generally shown at 10 in FIG. 1. While the vehicle seat assembly 10 is illustrated in FIG. 1 to be a bucket seat assembly, it should be understood that the principles of the invention are applicable to other types of seat assemblies, such as bench, captain and other types of seat assemblies. It should also be understood that the principles of the present invention are applicable to other vehicle interior trim components where leather trim is a component, such as head restraints. Still further, it should also be understood that the principles of this invention are applicable to all types of vehicle seat assemblies as well as non-vehicle seat assemblies.

The exemplary vehicle seat assembly 10 includes a seat frame (not shown) having a plurality of mounting brackets adapted to operatively secure the seat frame within an occupant compartment of a vehicle. Any suitable seat frame may be used. The seat frame may be constructed from any material suitable for application within a vehicle seat assembly 10, such as aluminum, steel or other metal alloy, composite material, or a suitable polymer. Further, the seat frame may be manufactured using techniques commonly known in the art, and relative to the type of material employed. By way of example, manufacturing techniques may include stamping, welding, fastening or molding a suitable material to form the seat frame.

The vehicle seat assembly 10 also includes a seat back, generally indicated at 14, and a lower seat assembly, generally indicated at 16. In at least one embodiment, the seat back 14 and the lower seat assembly 16 each have a cushion 18 supported on a frame and covered by a trim cover assembly 20. It should be understood that the frame could optionally be omitted. Here on out, the cushion 18 and the cover assembly 20 will be described with respect to the seat back 14, however it should be understood that the same or similar cushion 18 and trim cover assembly 20 may be employed on the seat bottom 16. However, it should be further understood that the cushion 18 for the seat back 14 can differ from the cushion 18 of the lower seat assembly 16 and/or the trim cover assembly 20 for the seat back 14 can differ from the trim cover assembly 20 for the lower seat assembly 16.

The cushion 18 can have any suitable size, shape and configuration, however in at least one embodiment, has an average thickness of 0.5 to 8 cm, and in at least another embodiment of 1 to 5 cm. The cushion 18 can comprise any suitable cushion material, such as a suitable resilient polymer. In at least one embodiment, suitable cushion materials will have a density of 1.5 to 4.5 pcf, in another embodiment of 2.0 to 3.75 pcf, and in yet other embodiments of 2.7 to 3.0 pcf. Density of the cushion material can be measured by ASTM Test Method No. D3574.

In at least one embodiment, suitable cushion materials will have a hardness of 175 N (Newtons) to 400 N, in other embodiments of 225 to 350 N, and in yet other embodiments of 275 to 325 N. Hardness of the cushion material can be measured by ASTM test method No. D3574. In at least one embodiment, suitable cushion materials will have a hysteresis of 18 to 30 KPa, in another embodiments of 20 to 28 KPa, and in yet other embodiments of 23 to 26 KPa. Hysteresis of the cushion material can be measured by ASTM Test Method No. D3574.

In at least certain embodiments, the cushion material comprises conventional polyurethane foam, soy-based foam, silicone, thermoplastic olefins, thermoplastic urethanes, and/or natural oil-based expanded polyurethanes and the like. In at least one embodiment, because of its environmentally friendly nature, soy-based polyurethane is preferred. Soy-based polyurethane can be made with any suitable soy-based polyols, such as those available, but not necessarily limited to, from Bayer, Urethane Soy Systems Corporation, and Dow Chemical. Any suitable soy-based polyurethane may be used, however in at least one embodiment, suitable soy-based polyurethanes include, but are not necessarily limited to those available from Renosol.

Figure 2:
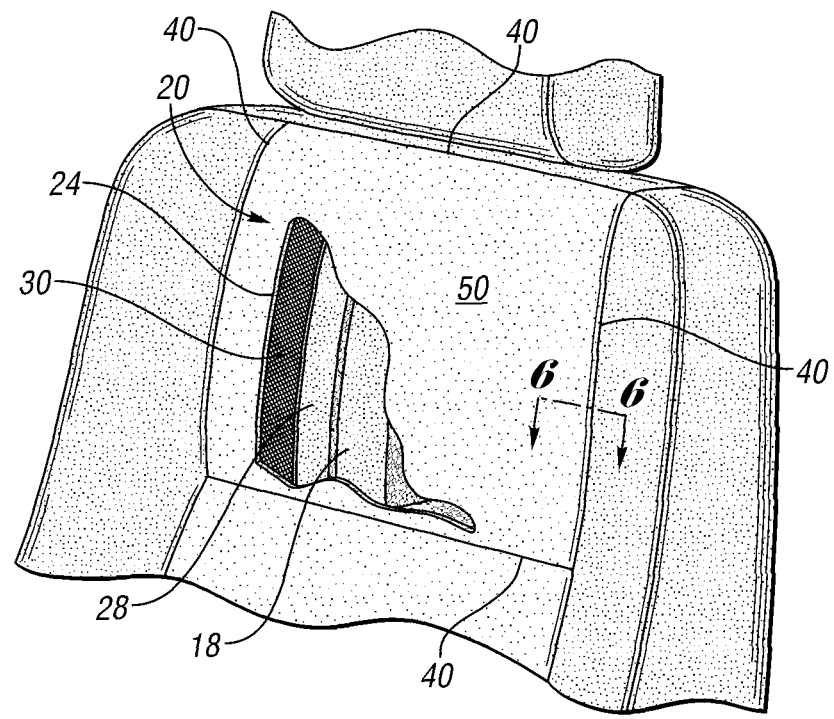
FIG. 2 is an enlarged, cut away view of the vehicle seat assembly of FIG. 1.
Figure 3:
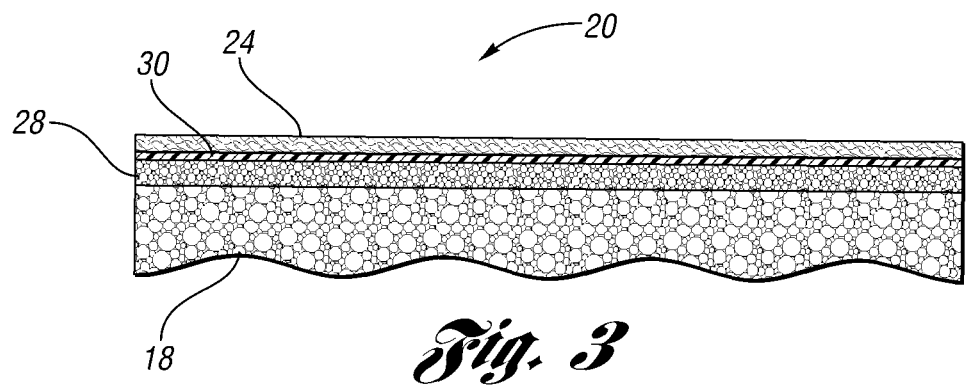
FIG. 3 is a schematic sectional view of components of the vehicle seat assembly illustrated in FIG. 1 taken through line 3-3.

As discussed above, the vehicle seat assembly 10 also includes a reinforced leather trim cover assembly 20 which is adapted to engage the cushion 18 in a covering relationship. As schematically shown in FIG. 2, the trim cover assembly 20 includes a leather cover layer 24. Additional materials for use with the trim cover assembly 20, may include a foam backing 28 secured to the underside of the leather trim material which may be manufactured from a variety of polymer foam materials. By way of example, the foam backing 28 may be polyethylene, polyester, wood fiber composite with polyester, polypropylene, polyurethane, or a polystyrene foam. The trim cover assembly 20 may also comprise trim fasteners (not shown) for securing the trim cover assembly 20 to one or more components (i.e., cushion 18 and/or frame) of the vehicle seat assembly 10.

Referring now to FIG. 2, there is illustrated an exemplary embodiment of the reinforced trim cover assembly 20 in accordance with various aspects of the present disclosure. In at least the disclosed embodiments, the reinforced trim cover assembly 20 includes a leather trim cover layer 24 and a reinforcing layer, such as a scrim indicated by 30. The scrim 30 could be any type of reinforcing material that could help limit the overall stretch and set characteristics of the leather trim cover layer 24. As illustrated in the Figures, in at least one embodiment the scrim 30 comprises intersecting strands 34 and 36. While the scrim 30 is illustrated in FIGS. 4 and 5 as having a crisscrossed or woven configuration, it should be understood that cross strands may not be necessarily be present and that various sizes of the strands and spacing can be used to obtain the benefits of the present disclosure.

In at least one embodiment, the scrim 30 is woven scrim, however it could also be formed otherwise such as by extrusion. In at least one embodiment, the scrim 30 could have strands 34 and/or 36 having a thickness or diameter of 0.1 to 4.0 mm, in other embodiments of 0.20 to 2.0, and in yet other embodiments of 0.25 to 1 mm. The strands 34 and 36 can be made of any suitable material. In at least certain embodiments, the strands 34 and 36 are made of a polyolefin, such as polyethylene or polypropylene, a nylon, fiberglass, polyester, etc., or a less rigid material such as a rubber or an elastomeric material. In some embodiments, the strands 34 and 36 are made of the same material, and in other embodiments the strands are made of varying, such as two different, materials. In other embodiments, the strands 34 and/or 36 have a core made of a more rigid material like fiberglass, nylon or PP (polypropylene), and a coating surrounding the core of a softer material like polyurethane. Moreover, the strands 34 and/or 36 could be made of a suitable metal.

In at least one embodiment, the scrim 30 is disposed between the leather trim cover layer 24 and a foam backing comfort layer 28, which comprises in at least one embodiment a relatively thin layer, such as 0.5 to 5 mm, of reticulated foam, however other layers, dimensions, and/or foam materials could be envisioned.

Figure 6:
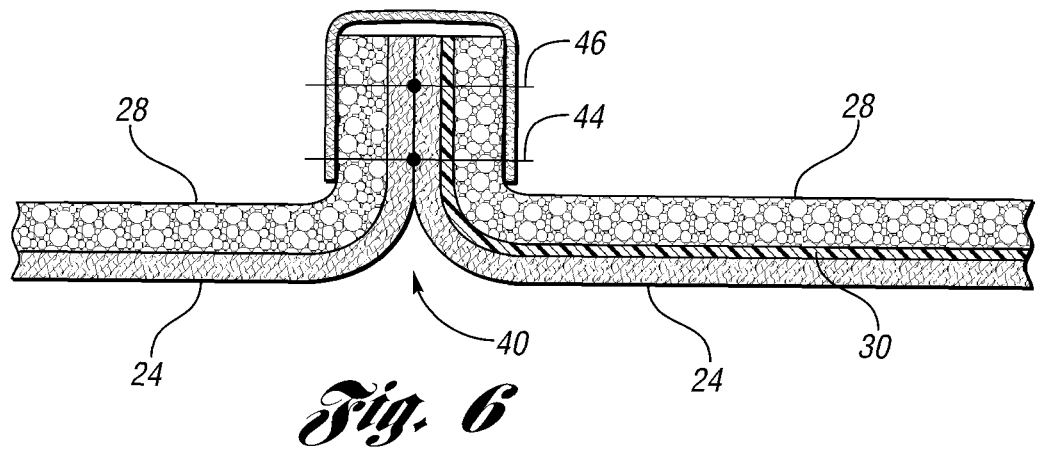
FIG. 6 is a schematic sectional view of the trim cover assembly taken through line 6-6 in FIG. 2.

The scrim 30 (i.e., reinforcing layer) can be, in at least one embodiment, attached to the trim leather cover layer 24 in any suitable manner. In at least one embodiment, the scrim 30 is sewn to the leather trim cover layer 24, as best shown in FIG. 6, by threads 44 and 46. The scrim 30 can be sewn or otherwise attached to the leather trim cover 24 in any suitable location, but in at least one embodiment is sewn to the leather trim cover along seams 40, or at least one of the seams, of the leather trim cover. In a particular embodiment, the scrim 30 is attached to the four seams 40 of the trim cover layer 24 forming the seat insert location 50, i.e., where the upper back or a rear end of an occupant sits on a seat. It should be understood that the scrim 30 could be attached to less than four seams and still be located in the seam insert location 50. In at least one embodiment, the scrim 30 is attached to the main central position of the cover assembly 20, such as to one or more of middle sections 60, 62 and 64. In at least another embodiment, the scrim 30 is attached to 10-80% of the surface area of the trim cover assembly 20, in yet another embodiment 20-70%, and in yet another embodiment 30-50%.

In other embodiments, the scrim 30 could be attached to different locations of the leather trim cover layer 24.

The trim cover assembly 20 being reinforced with the scrim 30 results in a trim cover assembly having better stretch and set characteristics relative to a trim cover assembly not having the scrim 30. This results in a trim cover assembly 20 having better wearability and aesthetics as it will be less susceptible to stretching and wrinkling In at least one embodiment, the trim cover assembly having a percent reduction in stretch relative to a similar trim cover assembly not having the reinforcing layer of 40% to 95% as measured according to SAE J855, in another embodiment of 50% to 90%, and in yet other embodiments of 60% to 85%. In at least one embodiment, the trim cover assembly will have a set (which is a measure of recovery) of less than 2%, in other embodiments of less than 1.75%, and in other embodiments of 0.1 to 1.5%. Stretch and set are both measured in accordance with SAE J855 and the values are obtained by measuring samples of assemblies that have uniform layers of materials.

In at least one embodiment, as best shown in FIGS. 4 and 5, the scrim layer 30 is disposed between the leather trim cover layer 24 and the reinforcing or foam comfort layer 28. However, it should be understood that in some situations the orientation of the scrim layer 30 and the foam layer 28 could be reversed such that the foam layer is disposed between the leather trim cover layer 24 and the scrim layer 30.

Any suitable type of scrim 30 having any suitable dimensions can be used. Factors that may go into deciding what type of scrim to be used include the stretch and set of the leather trim material of the leather trim layer 24, the design of the cover assembly 20 and/or the cushion 18, and whether a climate control system is present. For instance, when a climate control system is present, a more rigid scrim will likely be used so the structural intensity of openings 52 and the leather 24 can remain relatively intact. Rigidity can be tailored by strand spacing selection, materials selection, dimensional selection, and/or type of strand (cored vs. uniform), etc.

Strand spacing can be selected as needed, but in certain embodiments, the strands 36 and 34 will have a spacing of 5 to 25 strands per inch, in other embodiments of 8 to 20 strands per inch, and in yet other embodiments of 10 to 15 strands per inch.

The spacing for each set of strands 34 and 36 can be uniform so that square openings 52 are formed, such as is shown in FIG. 4, or could be different such that rectangular openings 52 are formed, such as is shown in FIG. 5. However, any other suitable opening shape could be used. Any suitable openings 52 size could be used, but in certain embodiments, the openings 52 will have a size of 0.25 to 5 mm$^2$, in other embodiments of 0.5 to 2.5 mm$^2$, and in yet other embodiments of 0.75 to 2.0 mm$^2$. Any suitable strand 34 and 36 thickness can be used, but in at least one embodiment, the strands 34, 36 will have a strand thickness or diameter of 0.1 to 3 mm, in other embodiments of 0.25 to 2 mm, and in yet other embodiments of 6.75 to 1.25 mm.

In the embodiment illustrated in FIG. 4, the strands 34 and 36 are uniformly spaced such that a square opening 52 is formed. The exemplary scrim 30 in FIG. 4 is relatively rigid having a relatively high strand count and a relatively small window opening 52. In one embodiment, the scrim 30 illustrated in FIG. 4 has strands 34 and 36 having an average thickness or diameter of 0.5 to 1.0 mm and a strand spacing of 11 strands per inch such that openings 52 having an average surface area of 0.56 mm$^2$ are formed therein.

Referring to FIG. 5, there is shown a second embodiment of the trim cover assembly 20. The trim cover assembly 20 in FIG. 5 is similar to the trim cover assembly shown in FIG. 4 except that the exemplary scrim 30 is made of strands 34 and 36 having different thickness and counts. Strands 34 of the scrim 30 illustrated in FIG. 5 are thicker than the strands 36 shown in FIG. 5. Strands 34 also have a lower strand count than strands 36, thus the exemplary openings 52 formed by the criss-crossing strands are rectangular and larger than those in FIG. 4. In this embodiment, the average strand size of the strands 34 and 36 is 0.5 to 0.75 mm thick, the spacing for strands is 11 strands per inch for strands 34 and 17 strands per inch for strands 36 such that the openings 52 are 2.0 mm$^2$.

Figure 7:
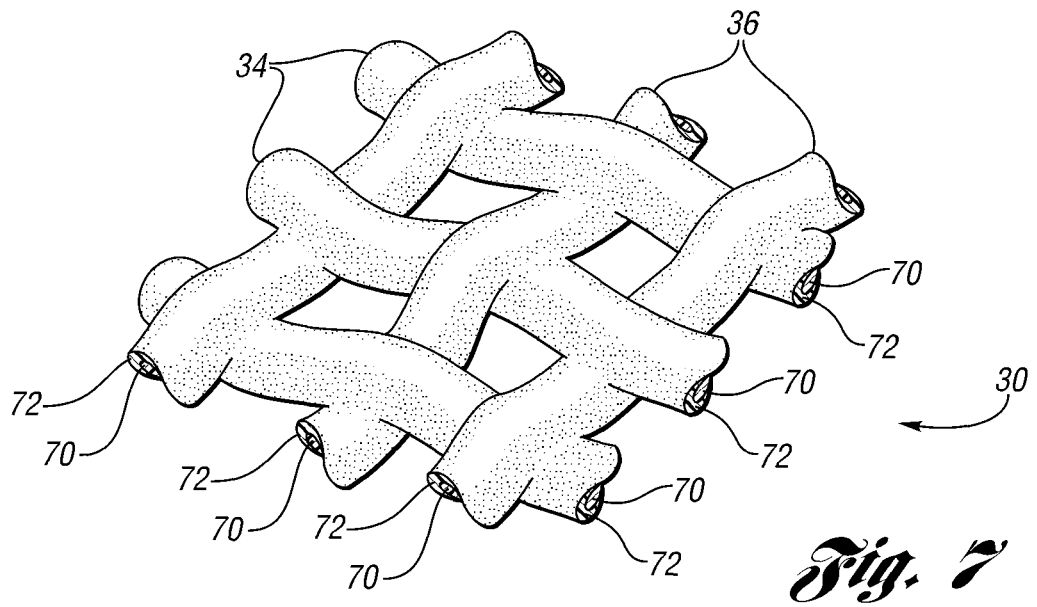
FIG. 7 is a perspective schematic view of a component usable with an embodiment of a trim cover assembly.

FIG. 7 shows an alternative embodiment of a scrim 30. The strands 34 and 36 of scrim 30 in FIG. 7 have a relatively rigid core 70, such as polyethylene or nylon, coated with a softer coating 72, such as rubber or elastomer. A cored scrim 30 like that illustrated in FIG. 7 is typically relatively rigid.

While embodiments have been illustrated and described, it is not intended that these embodiments illustrate and describe all possible forms of the disclosure. Rather, the words used in the specification are words of description rather than limitation, and it is understood that various changes may be made without departing from the spirit and scope of the disclosure.

What is claimed is:

1. A vehicle seat assembly comprising:
a frame;
a cushion supported on the frame; and
a trim cover assembly secured over the cushion, the trim cover assembly comprising a leather trim material and a scrim reinforcing layer secured to the leather trim material, the scrim reinforcing layer having openings and a periphery and being less flexible than the leather trim material, the scrim reinforcing layer being secured to the leather trim material about its entire periphery in a continuous manner, the leather trim material having a first surface area and a main body contacting portion comprising 30-50% of the first surface area, the scrim reinforcing layer being secured to the leather trim material under the main body contacting portion, and the main body portion being defined by stitching with the scrim reinforcing layer being secured to the leather trim material by the stitching.

2. The vehicle seat assembly of claim 1 wherein the trim cover assembly has a percent reduction in stretch relative to a similar trim cover assembly not having the reinforcing layer of 40% to 95% as measured according to SAE J855.

3. The vehicle seat assembly of claim 1 wherein the leather trim material has a first surface area and the scrim has a second surface area, the second surface area being 10-80% of the first surface area.

4. The vehicle seat assembly of claim 1 wherein the trim cover assembly has a set of less than 2% as measured according to SAE J855.

5. The vehicle seat assembly of claim 1 wherein the scrim reinforcing layer has a plurality of interconnecting strands having an average thickness of 0.1 to 4.0 mm, wherein the strands interconnect to form the openings, the openings having a size of 0.25 to 5.0 mm$^2$.

6. The vehicle seat assembly of claim 1 wherein the trim cover assembly has a set of less than 1% as measured according to SAE J855, the trim cover assembly further having a percent reduction in stretch relative to a similar trim cover assembly not having the scrim reinforcing layer of 50% to 90% as measured according to SAE J855.

7. The vehicle seat assembly of claim 1 wherein the scrim reinforcing layer is defined by a plurality of intersecting strands that form the openings, the openings having a size of 0.75 to 2.0 mm$^2$.

8. The trim cover assembly of claim 1 wherein the scrim reinforcing layer is sewn directly to the leather trim material.

9. A trim cover assembly securable over a cushion supported on a frame, said trim cover assembly comprising:
 a leather trim material having a first surface area and a main body contacting portion comprising a second surface area and a first periphery, the second surface area comprising 30-50% of the first surface area;
 a scrim reinforcing layer having a third surface area and a second periphery, the third surface area being substantially the same as the second surface area, the second periphery of the reinforcing layer being secured in a continuous manner to the first periphery of main body contacting portion of the leather trim material, the reinforcing layer being less flexible than the leather trim material; and
 a layer of backing material attached on the scrim reinforcing layer facing away from the leather trim material, the trim cover assembly having a percent reduction in stretch relative to a similar trim cover assembly not having the reinforcing layer of 40% to 95% as measured according to SAE J855, the leather trim material having a first surface area and the main body contacting portion comprising 30-50% of the first surface area, the scrim being secured to the leather trim material under the main body contacting portion, the main body portion being defined by stitching, and the scrim being secured to the leather trim material by the stitching.

10. The trim cover assembly of claim 9 wherein the trim cover assembly has a set of less than 2% as measured according to SAE J855.

11. The trim cover assembly of claim 9 wherein the scrim has a plurality of interconnecting strands having an average thickness of 0.1 to 4.0 mm, wherein the strands interconnect to form openings having an average surface area of 0.25 to 5.0 mm$^2$.

12. The trim cover assembly of claim 9 wherein the trim cover assembly has a set of less than 1% as measured according to SAE J855, the trim cover assembly further having a percent reduction in stretch relative to a similar trim cover assembly not having the scrim of 50% to 90% as measured according to SAE J855.

13. The trim cover assembly of claim 9 wherein the scrim is defined by a plurality of intersecting strands.

14. The trim cover assembly of claim 9 wherein the layer of backing material comprises a 0.5 to 5 mm layer of reticulated foam.

15. A method of manufacturing vehicle seat assembly, said method comprising:
 providing a cushion assembly comprising a cushion supported on a frame; and securing a trim cover assembly over the cushion assembly, the trim cover assembly comprising a leather trim material and a reinforcing layer having a periphery and being secured to the leather trim material in a continuous manner about the periphery, wherein the reinforcing layer comprises scrim sewn to the leather trim material, the scrim comprises intersecting strands, and the strands comprise a relatively rigid core coated with a coating, with the coating being softer than the core.

\* \* \* \* \*